US007114389B1

(12) United States Patent
Mouridsen

(10) Patent No.: US 7,114,389 B1
(45) Date of Patent: Oct. 3, 2006

(54) RAIN SENSOR ARRANGEMENT

(75) Inventor: Erik Bundsbæk Mouridsen, Skjern (DK)

(73) Assignee: VKR Holding A/S, Soeborg (DK)

( * ) Notice: Subject to any disclaimer, the term of this patent is extended or adjusted under 35 U.S.C. 154(b) by 34 days.

(21) Appl. No.: 10/398,801

(22) PCT Filed: Oct. 10, 2000

(86) PCT No.: PCT/DK00/00571

§ 371 (c)(1),
(2), (4) Date: Apr. 10, 2003

(87) PCT Pub. No.: WO02/31304

PCT Pub. Date: Apr. 18, 2002

(51) Int. Cl.
*G01W 1/00* (2006.01)

(52) U.S. Cl. .................................................... 73/170.17

(58) Field of Classification Search ............. 73/170.08, 73/170.09, 170.17, 170.21; 49/361, 21; 307/10.1
See application file for complete search history.

(56) References Cited

U.S. PATENT DOCUMENTS

| | | | | |
|---|---|---|---|---|
| 2,759,725 | A | | 8/1956 | Clark |
| 4,264,902 | A | * | 4/1981 | Miller ........................ 340/604 |
| 4,578,995 | A | * | 4/1986 | Meyer ..................... 73/170.17 |
| 4,665,351 | A | * | 5/1987 | Nyberg ....................... 318/483 |
| 4,837,986 | A | * | 6/1989 | Gagne ............................ 52/1 |
| 5,115,601 | A | | 5/1992 | Yamaguchi et al. |
| 5,293,105 | A | * | 3/1994 | West, Jr. ..................... 318/483 |
| 5,435,101 | A | * | 7/1995 | Garries ........................ 49/361 |
| 5,533,391 | A | * | 7/1996 | Brade et al. ............. 73/170.19 |
| 6,094,981 | A | * | 8/2000 | Hochstein ................ 73/170.17 |
| 2003/0172591 | A1 | * | 9/2003 | Labarre ....................... 49/248 |

FOREIGN PATENT DOCUMENTS

| | | |
|---|---|---|
| DE | 15 84 164 | 4/1969 |
| DE | 44 14 532 | 3/1995 |
| DE | 299 22 778 | 4/2000 |
| JP | 52-35223 | 9/1977 |
| JP | 61-141428 | 9/1986 |
| JP | 64-19788 | 1/1989 |
| JP | 64-31877 | 2/1989 |
| JP | 06 272452 | 9/1994 |
| JP | 6-272452 | 9/1994 |
| JP | 7-509291 | 10/1995 |

* cited by examiner

*Primary Examiner*—Edward Lefkowitz
*Assistant Examiner*—Andr Allen
(74) *Attorney, Agent, or Firm*—Merek, Blackmon & Voorhees, LLC

(57) ABSTRACT

Rain sensor arrangement for an operator for a window, said window comprising a frame, a sash pivotable with respect to said frame, and a pane mounted in said sash. The operator is adapted for pivoting said sash between a closed and an open position and vice versa, and said operator is controlled via a control circuitry responsive to input signals from at least a rain sensor. The rain sensor has at least one sensing area arranged so as to be protected against rain by said window, when the sash is in the closed position.

18 Claims, 5 Drawing Sheets

RAIN SENSOR ARRANGEMENT

Figure 1:
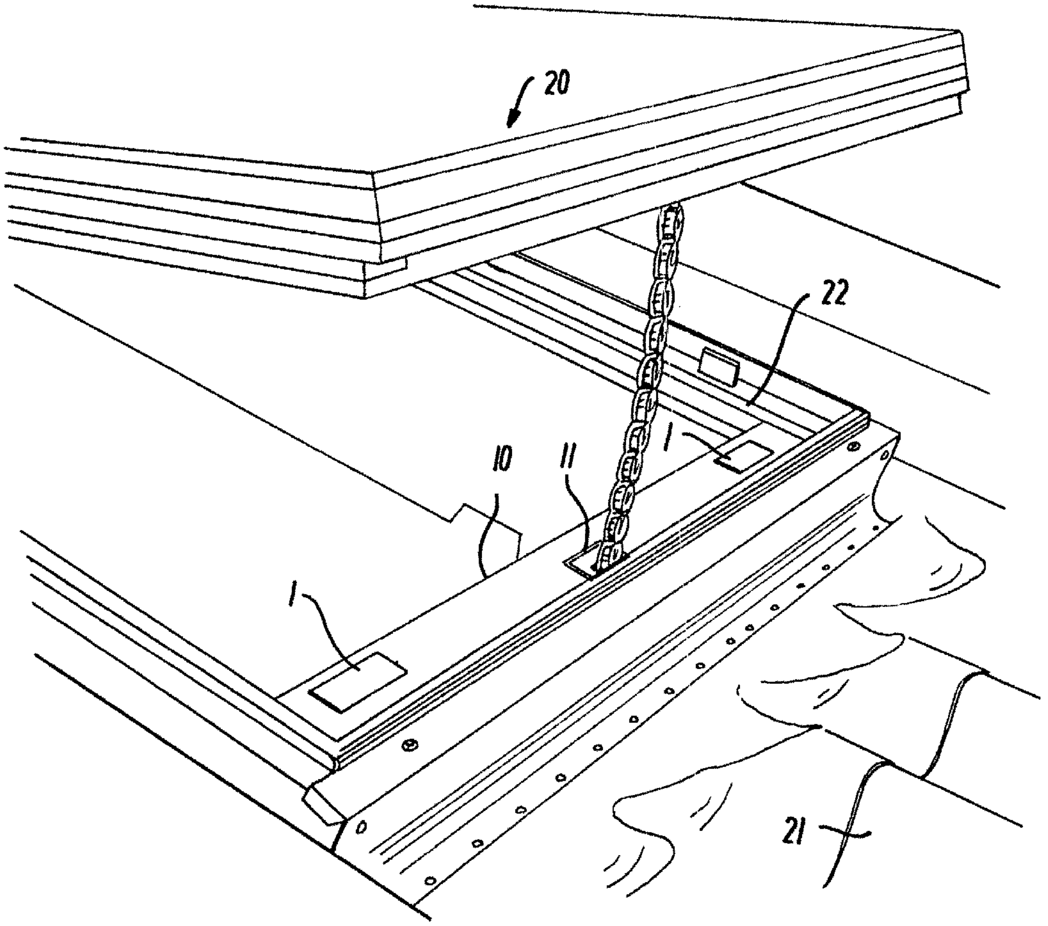

The present invention relates to an operator for opening and closing a window, where said operator comprises a housing, at least one rain sensor, and a control unit, which is responsive to input signals from said at least one rain sensor.

Windows in buildings, and in particular in roof windows, are often electrically operated. This allows for easy operation of windows in remote and inaccessible places. Moreover it allows for a window or a number of windows to be automatically operated, eg. to open if the temperature, the humidity or other parameter in the building, becomes too high. This then may aid in the control of the climate inside the building. Correspondingly a window may automatically close if eg. the temperature falls below a desired value or if it starts to rain or snow outside.

The automatic opening and closing of a window is controlled by a control unit receiving signals from various sensors for the different parameters, eg. the ones mentioned above. For convenience reference is in the following made to a single window, but the extent to which a window may be controlled individually or as part of a group will be evident to the skilled person.

Traditionally rain sensors are placed outside the building in order to respond to the rain (or other precipitation such as snow or dew) falling on them. The temperature and humidity sensors are placed in appropriate places inside of the building in which the climate is to be controlled. Typically the rain sensor has priority over the internal sensors. That is to say, if precipitation is detected the control circuitry effects the closing of the window irrespective of whether the other sensors inside the building indicate the need of keeping the window open or not. The reason being that the rain or snow which may enter the building can cause damages, whereas the climate inside of the building rather is a question of comfort for the occupants.

Placing the rain sensors outside, however, has some drawbacks. One is the fact that wires from the sensor have to be drawn from the inside of the building to the outside, eg. through the wall or the frame of the window. This is not desirable as it involves costly work to drill holes and draw the wires. Moreover, the holes potentially provides a passage for water into or through the structure, be it the wall, the frame or another element of the building.

Another drawback is that even though some weather conditions with rain may allow the windows to remain open despite it is raining, the rain sensor will always indicate to the control unit the window should be closed. Such weather conditions could be rain combined with little or no wind. If it, at the same time, is hot inside the building it would be desirable, but not possible, to keep the window open.

The present invention overcomes these drawbacks by providing a rain sensor arrangement according to the opening paragraph in which comprises a rain sensor having at least one sensing area arranged so as to be protected against rain by said window, when the sash is in the closed position.

However, placing the sensing area of the rain sensor inside the building involves other problems, because one has to make sure that sensor does detect the precipitation under all the circumstances where it is necessary to close the window.

The present invention overcomes this problem by locating said sensing area in the vicinity of a lower frame part of said window.

By placing the sensing area in the vicinity of the lower frame part of the window the pivotable sash and the pane mounted therein will in the open position of the window screen sensing area of the rain sensor against precipitation coming from uncritical directions. That is to say directions from which the precipitation is not likely to penetrate into the building through the open window to any greater extent.

In particular the sensing area is located in the vicinity of the side frame parts of said window.

Experiments have shown that these areas are the most critical for penetration of precipitation, and that in order to ensure proper closure of the window when precipitation penetrates there through it is the precipitation in these areas which it is important to detect.

In a preferred embodiment the rain sensor arrangement comprises at least two sensing areas.

This is advantageous as experiments have shown that by using two sensing areas the sensing area necessary to assure the above proper closure of the window is highly reduced as compared to the use of one sensor only. Using one sensor only, the sensing area would need to cover almost the entire area from one frame side part to the other.

In a preferred embodiment of the invention the sensing areas are located inside of the area covering from 0 mm to 200 mm from the end of the housing and preferably inside of the area covering from 30 mm to 120 mm from said end.

Experiments have shown that placing the sensing areas in these areas is a the best compromise between risk of the window not closing properly in the situations where it is actually needed and the possibility that the window closes in situation when it is not actually necessary.

In a preferred embodiment the sensing areas or the sensing areas, as the case may be, are of a capacitive type.

The use of capacitive sensing areas allow for a more reliable detection of precipitation because they can be made much less prone false detection due to conductive contamination than resistive detectors. The reason being, that if, which is very likely, the resistive sensor becomes contaminated with carbon containing particles the resistance eventually decreases to a value where the associated electronic circuitry interprets the low resistance as the sensor being permanently wet. If the sensing area of the capacitive sensor becomes coated with carbon particles, it does not significantly affect the capacitance as long as the sensing area is dry. On the other hand when raindrops hit the sensing area of the sensor the particulate coating absorbs the water and spreads it over a larger area of the surface. Experiments have shown that this spreading of the water over the sensing area actually changes the capacitance substantially more than a raindrop which domes over the sensor. As to the contamination it should be noted that with the rains sensor arrangement according to the invention the sensing area is much less likely to be contaminated, compared to a sensing area mounted outside of the building.

In particular preferred embodiment the control circuitry is responsive to the rate of change of capacitance of said sensing area.

The use of detection of rate of change of capacitance aids in making the sensor less prone false detection not only from contamination but also from humidity or dew precipitating comparably slow on the sensing area of the sensor. This is particular advantageous in case of people taking a shower in a bathroom, in which case it may be undesirable if the window closes automatically, thus trapping the humidity within the bathroom. Further it is advantageous because it allows the windows to stay open for venting purposes throughout the night without undesired response to dew.

In advantageous embodiment the rain sensor comprises circuitry for providing a frequency signal for the control circuitry based on the detected capacitance of the sensing area.

This gives a reliable and disturbance resistant signal to the control circuitry.

The present invention further overcomes the above drawbacks and problems by providing an operator for opening and closing a window where said operator comprises at least one sensing area.

In a preferred embodiment of the operator, the operator comprises a housing and that the sensing area of said rain sensor is located on said housing, preferably in appropriate cut-outs.

This has the advantage that the operator may be manufactured as a preassembled unit including the rains sensors. Wires for these sensors do then not have to be drawn during the installation, be it through the wall or from another location in the building behind the window.

Preferably the operator comprises at least two sensing elements, preferably located inside of the area covering from 0 mm to 200 mm from the end of the housing and preferably inside of the area covering from 30 mm to 120 mm from said end.

This assures good detection of precipitation as described above. In particular, when the housing is adapted to essentially extend along the lower frame part over the entire length between the frame side parts of a window. This again gives a good aesthetic appearance.

Preferably the sensing area or the sensing areas, as the case may be, are of a capacitive type, and preferably the control unit is responsive to the rate of change of capacitance of said sensing area or sensing areas.

Figure 2:
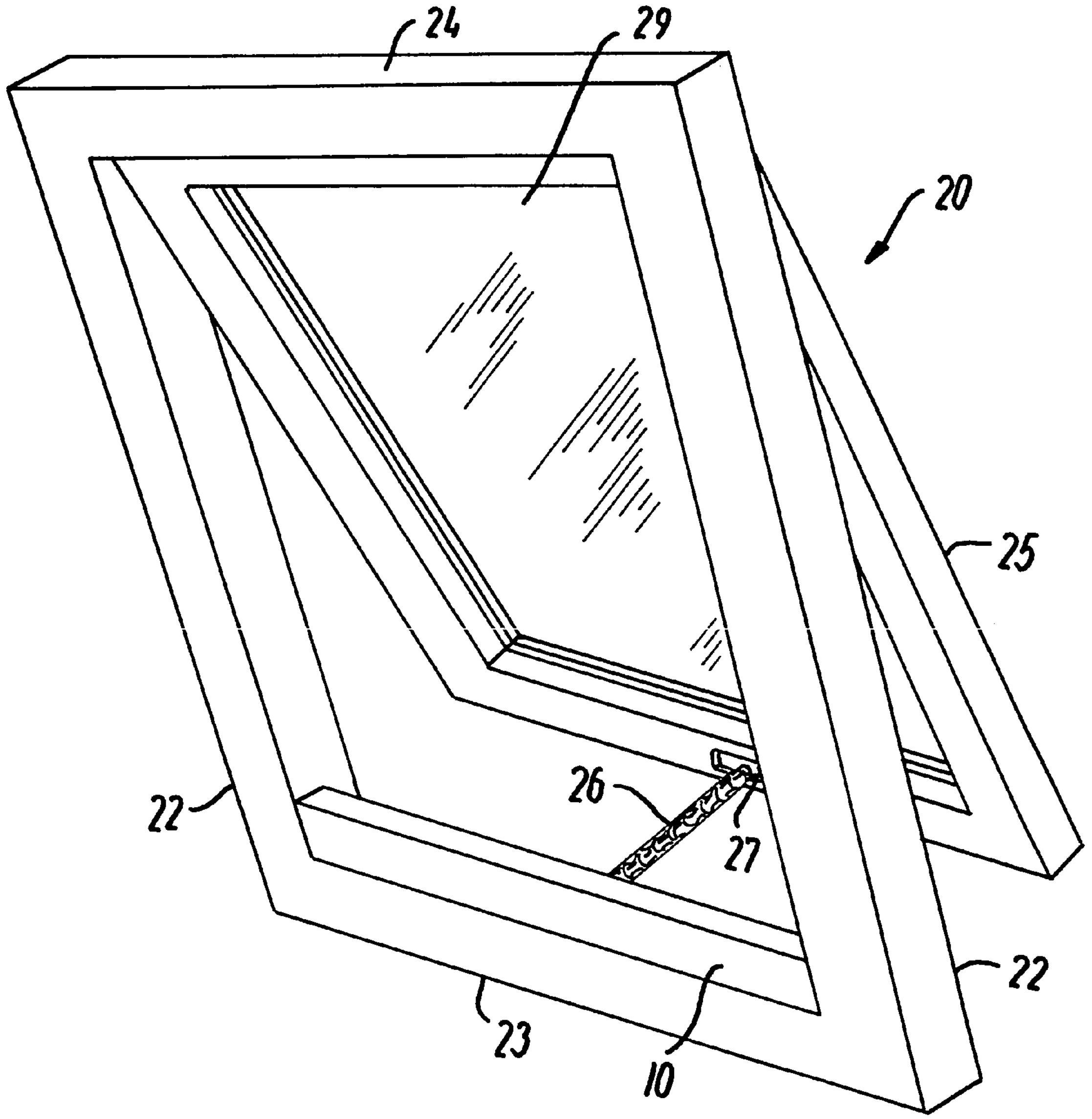
Figure 3:
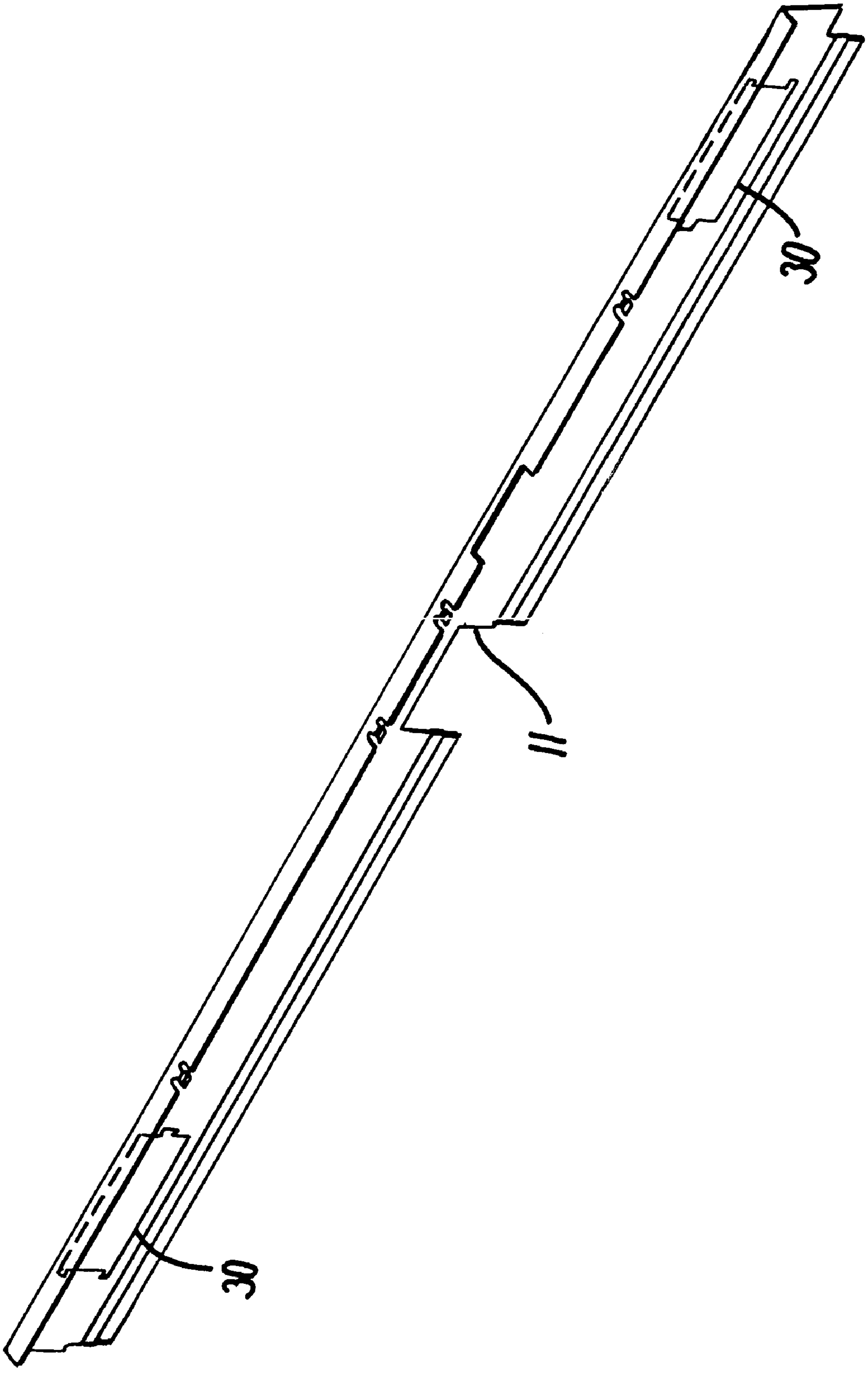
Figure 4:
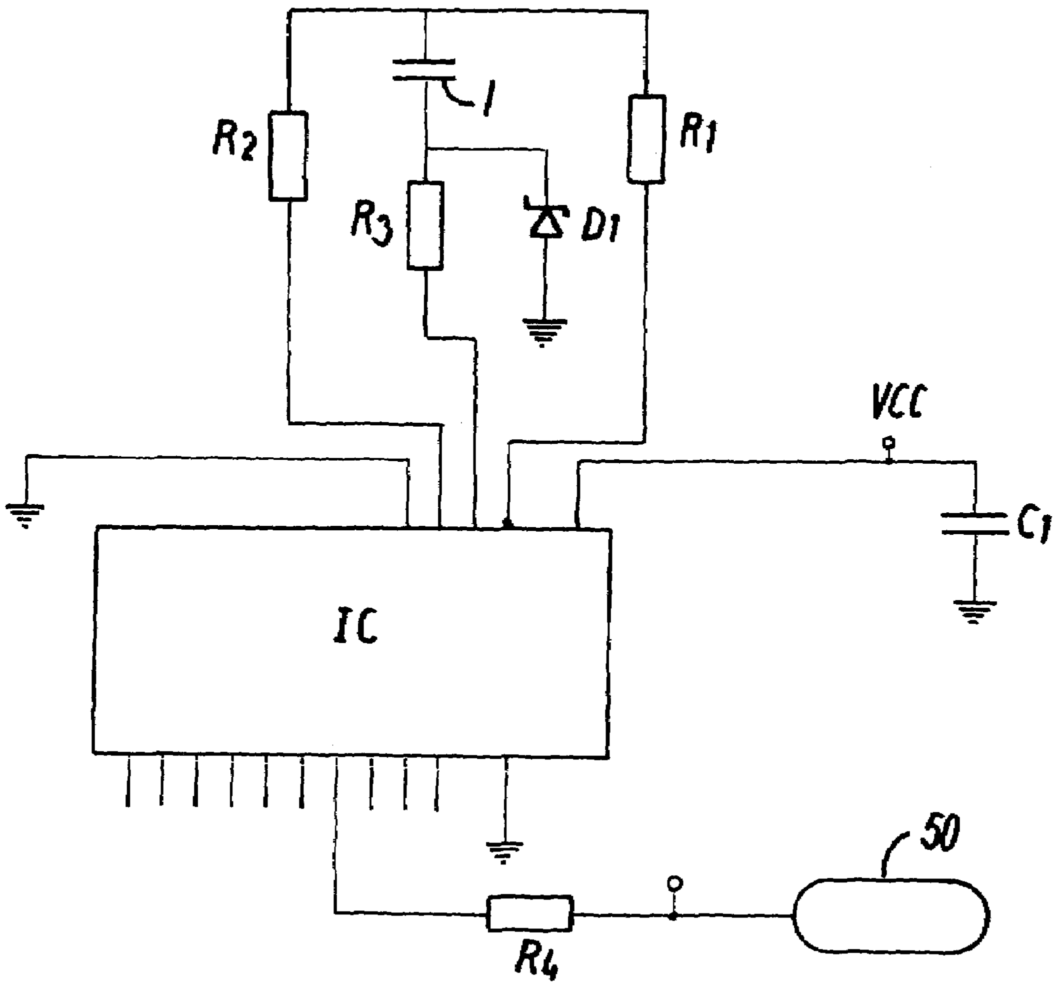
Figure 5:
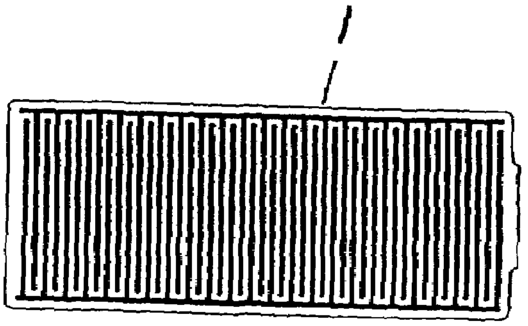
Figure 6:
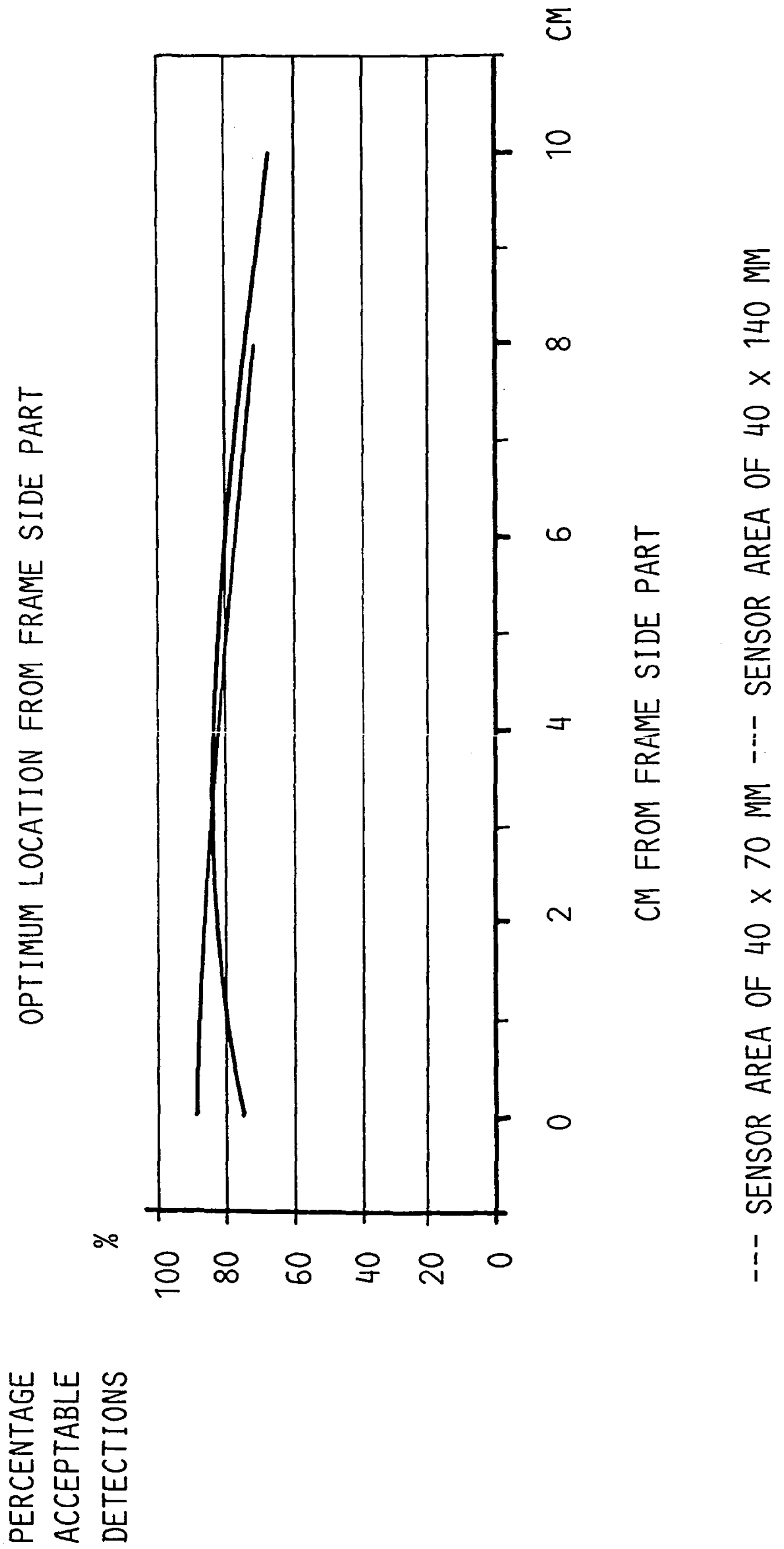

The invention will now be explained in greater detail described based on a description of examples of embodiments and the drawings. On the drawings, FIG. 1 schematically shows an outside perspective view of an open top-hung window with an operator and a rain sensor arrangement according to the present invention, FIG. 2 schematically shows an inside perspective view of an open top-hinged window with an operator and a rain sensor arrangement according to the present invention, FIG. 3 schematically shows a cover plate for the operator of FIG. 1 having the rain sensor arrangement according to the invention, FIG. 4 shows a diagram of the electric circuitry of the rain sensor, FIG. 5 is a plan view of the capacitive sensing area of the rain sensor, and FIG. 6 is a plot of experimental results indicating optimum location of the sensing areas.

Reference is first made to FIG. 1. FIG. 1 shows a perspective view of a top-hung roof window 20 mounted in a roof 21. As can be better seen on FIG. 2 the window 20 comprises a frame with two side parts 22 as well as a lower frame part 23 and an upper frame part 24. The window 20 further comprises a sash 25 which is hinged pivotably about a horizontal axis at the top of the frame. In the sash 25 a preferably transparent or translucent pane 29 is secured.

On or in connection with the lower frame part 23 an electric operator is located within a housing 10. The operator may be of any convention type such as a chain operator, in which an electric motor and a sprocket is used to drive a chain 26 in and out of the housing 10 through an opening 11. The chain 26 is preferably of a semi-rigid type, eg. bendable in one direction only. One end of the chain is located in the operator housing and the other end is secured to the sash by means of a bracket 27, thus allowing for the motor to transfer force to the sash 25 for opening and closing motions via the chain 26. Such an operator may eg. be found in DK-B1-171921. Alternatively an operator of the scissor type could be used. The housing 10 may comprise a base part adapted to be mounted on the lower frame part 23, and a cover covering the housing on three sides, leaving the ends open as they face the frame side parts 22 and may be considered as closed by these. Alternatively the operator may be more or less embedded in the frame and being covered only by a cover plate of the type shown in FIG. 3.

In the preferred embodiment the operator is a completely preassembled operator unit which may be mounted on the lower frame part of the window either before or after shipment to the costumer. Thus, the operator unit comprises not only the previously mentioned electric motor, sprocket and chain but also the control circuitry for the operation of the motor in response to input signals, eg. from a manually operated switch, an IR remote control, a timer, a temperature sensor, from other operators via an external bus, or in particular from a rain sensor.

As can be seen from FIGS. 1 and 2 the housing 10 essentially covers the entire length between the two frame side parts 22. The two sensors comprising capacitive sensing areas 1 are mounted directly on the housing 10 on the side facing the sash 25 and possibly parts of the pane 29 when the window 20 is in the closed position. The sensing areas preferably placed as close to the pane in the closed position as possible. In the actual embodiment shown in FIGS. 1 and 2 there will be a gap of approximately 1–2 mm between the pane 29 and the sensors 1. The sensing areas preferably have approximately the dimensions 30 mm×70 mm, but may be larger eg. 40 mm×140 mm. According to experiments conducted with various rain and wind conditions as well as with various inclinations of the window 22 the preferred location of the sensing areas 1 are inside of the area covering from 0 mm to 200 mm from the end of the housing and preferably inside of the area covering from 30 mm to 120 mm from the ends of the housing 10.

In an alternative embodiment, not shown, in which the operator does not cover the entire length between the two frame side parts 22, the capacitive sensing areas are placed directly on the lower frame part 23. In this embodiment the sensing areas also face the sash 25 and possibly the pane 29 or parts thereof in the closed position of the window. Accordingly the preferred locations of the sensing areas 1 are also in this embodiment in the vicinity of the frame side parts 22, that is to say inside of the area covering from 0 mm to 200 mm from the frame side parts 22 and preferably inside of the area covering from 30 mm to 120 mm from the frame side parts 22. Evidently in this case the sensors or at least the capacitive sensing areas 1 thereof cannot be integrated in the operating unit 10. Accordingly wires have to be drawn from the sensor or at least from the sensing areas 1 to the control circuitry, which is still preferably within the operator housing 10.

Even if the above embodiment refers to a pivotable window of the top-hung type, the considerations regarding the location of the sensing areas are also valid for pivotable windows of the type where the sash pivots about a horizontal axis between the frame side parts the centre area of those. For aesthetic purposes however windows of his type often have the operator placed in connection with the upper frame side part. Just as in the previously mentioned embodiment his then necessitates wires to be drawn from the sensors or at least from the sensing areas thereof to the control circuitry.

As can be seen from FIG. 5 the capacitive sensing area 1 is preferably of the interdigitated type, allowing the air gap in between the electrodes to be bridged by a raindrop. Even a single raindrop will drastically change the capacitance of the sensing area 1 because of the high relative permittivity of water compared to air. The relative permittivity of air being approximately 1 and the relative permittivity of liquid water being approximately 80 at 25° C. and slightly less than 88 at 0° C. The sensing area 1 is preferably part of a sensor unit comprising a circuit board carrying the electronic circuit of FIG. 4, because this allows the use of a relatively disturbance resistant signal to the control unit within the housing 10. This electronic circuit will be explained below. Having the electronic circuit in connection with the sensing area renders the sensor a certain overall height, and it is thus preferred to place the sensor units on the housing 10 or on a cover plate forming part thereof, eg. in appropriate cut-outs 30 as depicted in FIG. 3. If it can be accepted that the sensors protrude over the housing 10 they may of course be mounted directly thereon instead, thus avoiding the cut-outs. Similar considerations are valid if the sensors units are to be placed directly on the lower frame part 23 in accordance with the embodiment described above.

The electronic circuit of FIG. 4 is built around an Integrated Circuit such as a Philips HEF4060b or a Motorola MC4060b, referred to as "14 bit binary counter and oscillator" or "14 stage ripple carrier binary counter/divider and oscillator", respectively.

When connected to the RC network comprising resistors R1, R2, R3 the diode D1 and the capacitor formed by the capacitive sensing area 1 the IC forms an oscillator. In the present invention the component values have been chosen so as to give an oscillator frequency centred about 150 kHz when the sensing area 1 is dry. The IC allows for different frequency divided outputs. In the present case output O6 giving an output centre frequency of approximately 500 Hz.

If a single raindrop settles on the sensing area the change in capacitance will result in a frequency change $\Delta f$ in the output signal of approximately 60 Hz.

This frequency signal is output through resistor R4 and a terminal 50, to the control circuitry within the operator housing 10. Accordingly three wires have to be drawn to the sensor, viz. one for the supply voltage VCC, one for ground, and one for the output signal. Providing a frequency signal directly at the sensing area 1 in this manner makes the signal much less prone to disturbance compared to eg. the situation where two lead wires would simply be drawn from the control circuitry in the housing 10 to the sensing area 1.

The control circuitry, which is preferably microprocessor based, receives the frequency signal from the rain sensor. The received signal is monitored in time, and the rate of change of the frequency $\Delta f/t$ is, based on predetermined rules, used as an indication of rain or snow.

Using the rate of change of the frequency $\Delta f/t$ has the advantage that slowly settling precipitation such as dew only slowly changes the capacitance of the sensing area 1 and thus the output frequency of the sensor. Accordingly the control circuitry in the housing 10 does not interpret this slow change as rain or snow, and thus leave the window 20 open.

Placing the sensing area of the rain sensor in accordance with the invention has the further advantage that it may aid in detection of a window not closing properly. Thus if the control circuitry detects not only rate of change of the frequency but also the absolute value, this value may be compared to stored values corresponding to dry and wet conditions. If then, after as sudden change in frequency interpreted as rain, the frequency does not return to the value corresponding to a dry sensing area, the control circuitry could interpret this as a defective window pane or a window not closing and issue a warning.

As mentioned earlier experiments have been conducted optimum location of the sensing areas 1. Using moisture sensitive paper placed in the area in the vicinity of the lower frame part here the operator was to be placed, test were carried out using different wind directions, raindrop sizes, window inclinations, window openings. For symmetry reasons the tests were conducted from one side only. These tests were evaluated for two different sizes of the sensing areas 1, viz, 40 mm×70 mm and 40 mm×140 mm.

FIG. 6 indicates the percentages of test situations giving acceptable detection results at a given location from the frame side parts 22. As can be seen from FIG. 6 the optimum location of a sensing area of 40 mm×70 mm is somewhat inward from the frame side parts 22 topping at about 82 percent of the situations being acceptably detected. For a sensing area 40 mm×140 mm the optimum is at the frame side part 22, topping at about 89 percent. It should be noted that for front wind directions sensors in both sides would detect the precipitation, thus giving a higher total percentage than indicated above. As, will seen the larger area gives a slightly higher detection percentage. This however, is not sufficient to justify the higher costs involved in using a larger sensor, and accordingly the smaller is preferred.

The experiments further indicate that the sensing areas preferably should be located in the vicinity of the lower frame part 23, preferably so as to cover the area from 40 mm to 80 mm from the lower frame part 23. Depending of the size of the housing 10 this may not be possible, and in this case the sensing areas should be placed as far from the lower frame part as the housing 10 allows.

The invention claimed is:

1. A rain sensor arrangement comprising a window with a frame comprising first and second frame side parts and a lower frame part, a sash pivotable with respect to said frame, and a pane mounted in said sash, an operator for said window, and a rain sensor, said operator being adapted for pivoting said sash between a closed and an open position and vice versa, and said operator being controlled via a control circuitry responsive to input signals from at least the rain sensor, and said rain sensor having at least two sensing areas arranged so as to be protected against rain by said window, when the sash is in the closed position, wherein said sensing areas are located in the vicinity of the lower frame part of said window and in the vicinity of the frame side parts of said window, wherein said operator comprises a housing on which said sensing areas are located, and wherein said housing essentially extends along the lower frame part over the entire length between the first and second frame side parts, so as to have a first end and second end adjacent a respective one of said first and second frame side parts.

2. A rain sensor arrangement according to claim 1, wherein the sensing areas are located inside of a respective area covering from 0 mm to 200 mm from each of said first and second ends of the housing.

3. A rain sensor arrangement according to claim 1, wherein the sensing areas are located inside of a respective area covering from 30 mm to 120 mm from each of said first and second ends of the housing.

4. A rain sensor arrangement according to claim 1, wherein the sensing areas are of a capacitive type.

5. A rain sensor arrangement according to claim 4, wherein the rain sensor comprises circuitry for providing a frequency signal for the control circuitry based on the detected capacitance of the sensing areas.

6. A rain sensor arrangement according to claim 4, wherein said control circuitry is responsive to the rate of change of capacitance of said sensing areas.

7. The use of a rain sensor arrangement according to claim 1, for automatically controlling the closing a window upon detection of precipitation.

8. An operator for opening and closing a window, said operator comprising a housing having a first end and a second end, and said operator comprising at least one rain sensor having at least two sensing areas located on said housing, wherein the sensing areas are located inside of a respective area covering from 0 mm to 200 mm from each of the first and second ends of the housing.

9. An operator according to claim 8, wherein the sensing areas are located inside of a respective area covering from 30 mm to 120 mm from each of the first and second ends of the housing.

10. An operator according to claim 8, wherein the sensing areas are of a capacitive type.

11. An operator according to claim 10, wherein said control unit is responsive to the rate of change of capacitance of said sensing areas.

12. A window comprising a frame comprising first and second frame side parts and a lower frame part, a sash pivotable with respect to said frame, and a pane mounted in said sash, an operator for said window, said operator being adapted for pivoting said sash between a closed and an open position and vice versa, and said operator being controlled via a control circuitry responsive to input signals from at least a rain sensor, and a rain sensor having at least two sensing areas arranged so as to be protected against rain by said window, when the sash is in the closed position, wherein said sensing areas are located in the vicinity of the lower frame part of said window and in the vicinity of the frame side parts of said window, and said operator comprises a housing on which said sensing areas are located.

13. A window according to claim 12, wherein said housing essentially extends along the lower frame part over the entire length between the first and second frame side parts, so as to have a first end and second end adjacent a respective one of said first and second frame side parts.

14. A window according to claim 13, wherein the sensing areas are located inside of a respective area covering from 0 mm to 200 mm from each of said first and second ends of the housing.

15. A window according to claim 14, wherein the sensing areas are located inside of a respective area covering from 30 mm to 120 mm from each of said first and second ends of the housing.

16. A window according to claim 12, wherein that the sensing areas are of a capacitive type.

17. A window according to claim 16, wherein the rain sensor comprises circuitry for providing a frequency signal for the control circuitry based on the detected capacitance of the sensing areas.

18. A window according to claim 16, wherein said control circuitry is responsive to the rate of change of capacitance of said sensing areas.

* * * * *